(12) United States Patent
Tripodina

(10) Patent No.: US 10,458,281 B2
(45) Date of Patent: Oct. 29, 2019

(54) RESILIENT MOUNTING ASSEMBLY FOR A TURBINE ENGINE

(71) Applicant: United Technologies Corporation, Farmington, CT (US)

(72) Inventor: Brian Tripodina, Granby, CT (US)

(73) Assignee: United Technologies Corporation, Farmington, CT (US)

( * ) Notice: Subject to any disclaimer, the term of this patent is extended or adjusted under 35 U.S.C. 154(b) by 157 days.

(21) Appl. No.: 15/620,257

(22) Filed: Jun. 12, 2017

(65) Prior Publication Data
US 2018/0355762 A1 Dec. 13, 2018

(51) Int. Cl.
| F01D 25/00 | (2006.01) |
| F01D 25/28 | (2006.01) |
| F01D 25/24 | (2006.01) |
| F01D 11/20 | (2006.01) |
| F01D 11/24 | (2006.01) |
| F01D 25/04 | (2006.01) |

(Continued)

(52) U.S. Cl.
CPC .............. *F01D 25/28* (2013.01); *F01D 11/20* (2013.01); *F01D 11/24* (2013.01); *F01D 25/04* (2013.01); *F01D 25/14* (2013.01); *F01D 25/24* (2013.01); *F05D 2230/642* (2013.01); *F05D 2240/14* (2013.01); *F05D 2260/31* (2013.01); *F05D 2260/96* (2013.01); *F16B 5/0241* (2013.01); *F16B 5/0258* (2013.01)

(58) Field of Classification Search
CPC .......... F01D 25/04; F01D 25/14; F01D 25/24; F01D 25/28; F01D 11/20; F01D 11/24; F05D 2240/14; F05D 2260/96; F05D 2260/31; F05D 2230/642; F16B 5/0258; F16B 5/0241
See application file for complete search history.

(56) References Cited

U.S. PATENT DOCUMENTS

| 4,530,491 A | * | 7/1985 | Bucksbee ............. | F16F 1/3732 267/141 |
| 5,222,694 A | * | 6/1993 | Smoot .................... | B64C 1/066 244/119 |
| 5,273,249 A | | 12/1993 | Peterson et al. | |

(Continued)

OTHER PUBLICATIONS

EP search report for EP18177379.7 dated Sep. 13, 2018.

*Primary Examiner* — Hieu T Vo
*Assistant Examiner* — Sherman D Manley
(74) *Attorney, Agent, or Firm* — O'Shea Getz P.C.

(57) ABSTRACT

An assembly is provided for a turbine engine that includes a first mounting bracket, a second mounting bracket and a first resilient mount attaching the second mounting bracket to the first mounting bracket. The first resilient mount includes a first isolator support, a second isolator support, a first isolator, a second isolator and a fastener. The first isolator support and the second isolator support are arranged on opposing sides of the second mounting bracket. The first isolator support is between the second mounting bracket and the first isolator. The second isolator support is between the second mounting bracket and the second isolator. The first isolator is between the first isolator support and the first mounting bracket. The fastener projects through the first mounting bracket, the second mounting bracket, the first isolator support, the second isolator support, the first isolator and the second isolator.

18 Claims, 12 Drawing Sheets

(51) Int. Cl.
*F01D 25/14* (2006.01)
*F16B 5/02* (2006.01)

(56) References Cited

U.S. PATENT DOCUMENTS

| | | | | |
|---|---|---|---|---|
| 5,743,509 | A * | 4/1998 | Kanda | F16F 1/38 |
| | | | | 248/634 |
| 6,185,925 | B1 | 2/2001 | Proctor et al. | |
| 6,446,931 | B1 * | 9/2002 | Hayashi | B60G 15/067 |
| | | | | 248/635 |
| 7,389,977 | B1 * | 6/2008 | Fernandez | F16F 3/087 |
| | | | | 267/141.2 |
| 7,506,619 | B1 | 3/2009 | Lak et al. | |
| 7,735,812 | B2 * | 6/2010 | Fitzgerald | F16F 15/08 |
| | | | | 267/141 |
| 7,857,585 | B2 | 12/2010 | Dhaliwal | |
| 8,092,146 | B2 | 1/2012 | Legare et al. | |
| 8,523,154 | B2 * | 9/2013 | Fujiwara | F16F 3/0873 |
| | | | | 267/293 |
| 8,839,629 | B2 * | 9/2014 | Hurlin | B64D 27/26 |
| | | | | 244/54 |
| 8,939,437 | B2 * | 1/2015 | Kobori | F16F 1/3735 |
| | | | | 267/140.3 |
| 9,341,074 | B2 | 5/2016 | Schimmels et al. | |
| 2002/0053837 | A1 | 5/2002 | Arilla et al. | |
| 2013/0071203 | A1 | 3/2013 | Hay | |
| 2014/0030066 | A1 * | 1/2014 | Schimmels | F01D 11/24 |
| | | | | 415/116 |
| 2014/0230943 | A1 | 8/2014 | Parrish | |
| 2016/0003086 | A1 | 1/2016 | Day et al. | |
| 2016/0032834 | A1 | 2/2016 | Plante et al. | |
| 2016/0047266 | A1 | 2/2016 | Powell | |
| 2016/0348587 | A1 * | 12/2016 | Banhos | F01D 11/24 |
| 2018/0187571 | A1 * | 7/2018 | Recuero | F02C 7/20 |
| 2018/0209298 | A1 * | 7/2018 | Binsberger | F01D 25/04 |

* cited by examiner

RESILIENT MOUNTING ASSEMBLY FOR A TURBINE ENGINE

BACKGROUND OF THE INVENTION

1. Technical Field

This disclosure relates generally to a gas turbine engine and, more particularly, to a resilient mounting assembly for attaching different turbine engine components together.

2. Background Information

Various mounts are known in the art for attaching a component to a case of a turbine engine. While known mounts have various advantages, there is still room in the art for improvement. For example, there is room in the art for a mount which can better accommodate thermally induced movement between the component and the case while also providing vibration damping between the component and the case.

SUMMARY OF THE DISCLOSURE

According to an aspect of the present disclosure, an assembly is provided for a turbine engine. This turbine engine assembly includes a first mounting bracket, a second mounting bracket and a first resilient mount attaching the second mounting bracket to the first mounting bracket. The first resilient mount includes a first isolator support, a second isolator support, a first isolator, a second isolator and a fastener. The first isolator support and the second isolator support are arranged on opposing sides of the second mounting bracket. The first isolator support is between the second mounting bracket and the first isolator. The second isolator support is between the second mounting bracket and the second isolator. The first isolator is between the first isolator support and the first mounting bracket. The fastener projects through the first mounting bracket, the second mounting bracket, the first isolator support, the second isolator support, the first isolator and the second isolator.

According to another aspect of the present disclosure, another assembly is provided for a turbine engine. This turbine engine assembly includes a turbine engine case and a turbine engine component outside of the turbine engine case. The turbine engine assembly also includes a resilient mounting assembly radially between the turbine engine case and the turbine engine component. The resilient mounting assembly includes a first mounting bracket, a second mounting bracket and a first resilient mount. The first mounting bracket is attached to the turbine engine case. The second mounting bracket is attached to the turbine engine component. The first resilient mount attaches the second mounting bracket to the first mounting bracket. The first resilient mount includes a first isolator, a second isolator and a fastener with a longitudinal centerline. The fastener is configured with and extends longitudinally through the first mounting bracket, the second mounting bracket, the first isolator and the second isolator such that the second mounting bracket is longitudinally between the first isolator and the second isolator, the first isolator is compressed longitudinally between the first mounting bracket and the second mounting bracket, and the second isolator is compressed longitudinally between the second mounting bracket and a head of the fastener.

The first isolator may be within a recess of the first isolator support. In addition or alternatively, the second isolator may be within a recess of the second isolator support.

The first isolator support may be configured as or otherwise include a cupped isolator support that include a base and an annular lip. The base may be between and longitudinally contacts the second mounting bracket and the first isolator. The lip may circumscribe the first isolator.

The second isolator support may be configured as or otherwise include a cupped isolator support that includes an annular base and an annular lip. The base may be between and longitudinally contacts the second mounting bracket and the second isolator. The lip may circumscribe the second isolator.

At least one of the first isolator or the second isolator may be configured as or otherwise include a body of metal wire mesh. For example, the first isolator and the second isolator may each be configured as or otherwise include a body of metal wire mesh.

The first isolator may include a first portion and a second portion. A shelf may be formed between the first portion and the second portion. The first isolator support may be seated on the shelf such that the second portion projects through the first isolator support and engages the second isolator.

The second isolator may be configured as an annular puck.

The first resilient mount may further include a center post which projects through the second mounting bracket, the first isolator support, the second isolator support, the first isolator and the second isolator. The center post may extend longitudinally between and longitudinally engage the fastener and the first mounting bracket.

The fastener may include a bolt and a nut plate. The bolt may project through the first mounting bracket, the second mounting bracket, the first isolator support, the second isolator support, the first isolator and the second isolator. The nut plate may be mated with the bolt and mounted to the first mounting bracket on a side of the first mounting bracket opposite the first isolator.

The assembly may also include a second resilient mount. The first mounting bracket may include a first flange and a second flange. The first resilient mount may attach the second mounting bracket to the first flange. The second resilient mount may attach the second mounting bracket to the second flange.

The second resilient mount may include a first isolator support, a second isolator support, a first isolator, a second isolator and a fastener. The first isolator support and the second isolator support may be arranged on opposing sides of the second mounting bracket. The first isolator support may be between the second mounting bracket and the first isolator. The second isolator support may be between the second mounting bracket and the second isolator. The first isolator may be between the first isolator support and the second flange. The fastener may project through the second flange, the second mounting bracket, the first isolator support, the second isolator support, the first isolator and the second isolator.

The first mounting bracket may also include a base laterally between and longitudinally offset from the first flange and the second flange. The second mounting bracket may be configured with an opening that provides a longitudinally extending line of sight through the first mounting bracket to one or more apertures in the base.

The assembly may also include a turbine engine component and a pair of mounting fasteners attaching the second mounting bracket to the turbine engine component. The mounting fasteners may be aligned laterally between the first resilient mount and the second resilient mount.

The assembly may also include a turbine engine component and a pair of mounting fasteners attaching the second mounting bracket to the turbine engine component. The first resilient mount and the second resilient mount may be aligned laterally between the mounting fasteners.

The second mounting bracket may be configured from a plurality of discrete pieces of formed sheet metal that are bonded together.

The assembly may also include a turbine engine case and a duct of an active clearance control system. The duct may extend circumferentially about the turbine engine case and configured to direct impingement air onto the turbine engine case. The first mounting bracket may be attached to the turbine engine case. The second mounting bracket may be attached to the duct.

The assembly may also include an active clearance control system. The turbine engine component may be configured as or otherwise include a duct of the active clearance control system. The duct may extend at least partially circumferentially around the turbine engine case and/or may be configured to direct impingement air onto the turbine engine case.

The first resilient mount may further include a first isolator support and a second isolator support. The first isolator support may provide a longitudinal buffer between the first isolator and the second mounting bracket. The second isolator support may provide a longitudinal buffer between the second isolator and the second mounting bracket.

The foregoing features and the operation of the invention will become more apparent in light of the following description and the accompanying drawings.

DETAILED DESCRIPTION OF THE INVENTION

Figure 1:
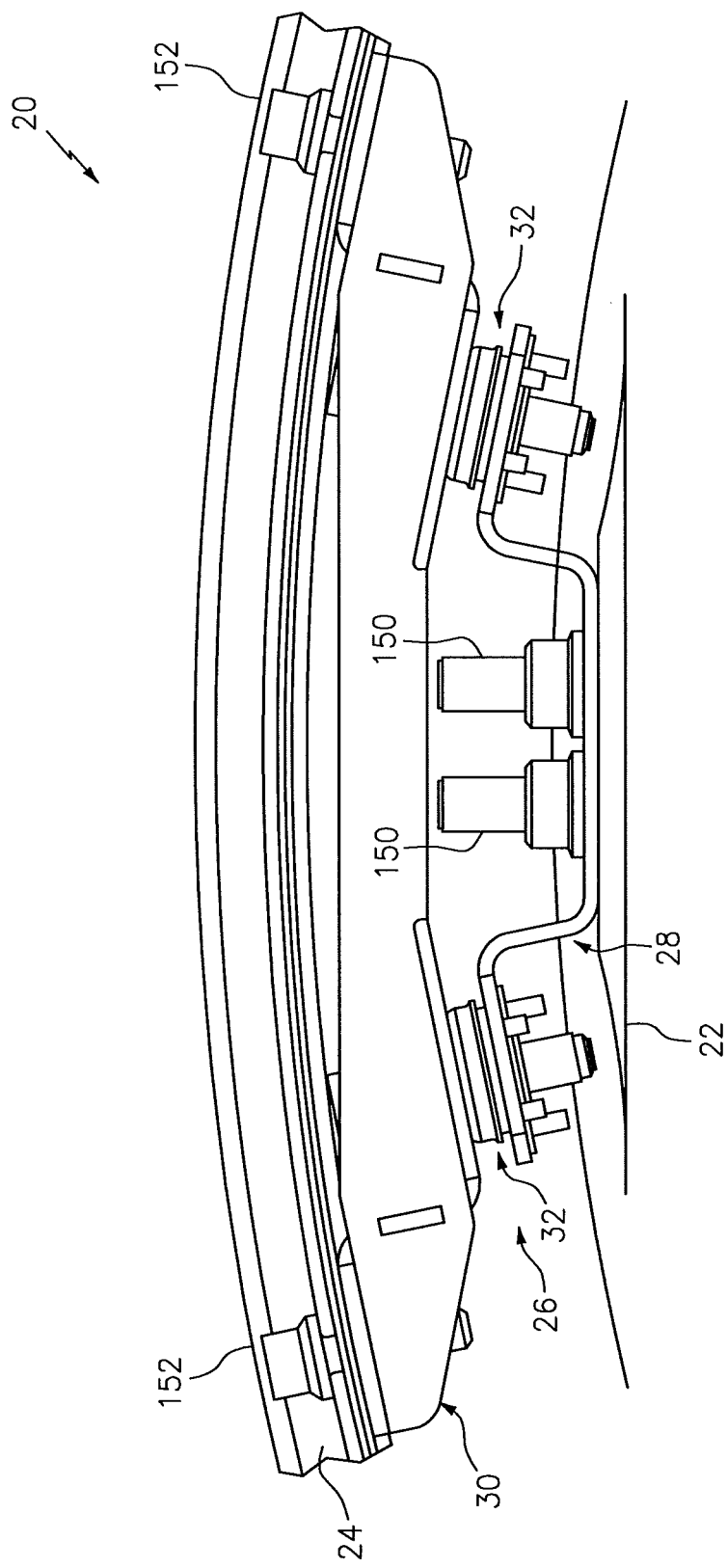
FIG. 1 is a partial illustration of an assembly for a turbine engine.

FIG. 1 illustrates an assembly 20 for a turbine engine such as, but not limited to, a turbofan gas turbine engine or a turbojet gas turbine engine for an aircraft propulsion system. The turbine engine assembly 20 includes a first (e.g., lower or radial inner) turbine engine component 22, one or more second (e.g., upper or radial outer) turbine engine components 24 and at least one resilient mounting assembly 26; see also FIGS. 10 and 13.

The resilient mounting assembly 26 mounts the second turbine engine components 24 to the first turbine engine component 22. The resilient mounting assembly 26 of FIG. 1 is also configured to provide vibration damping between and/or accommodate slight movement due to, for example, thermal growth variation between the first turbine engine component 22 and the second turbine engine components 24. The resilient mounting assembly 26 includes a first (e.g., lower or radial inner) mounting bracket 28, a second (e.g., upper or radial outer) mounting bracket 30 and one or more resilient mounts 32.

Figure 2:
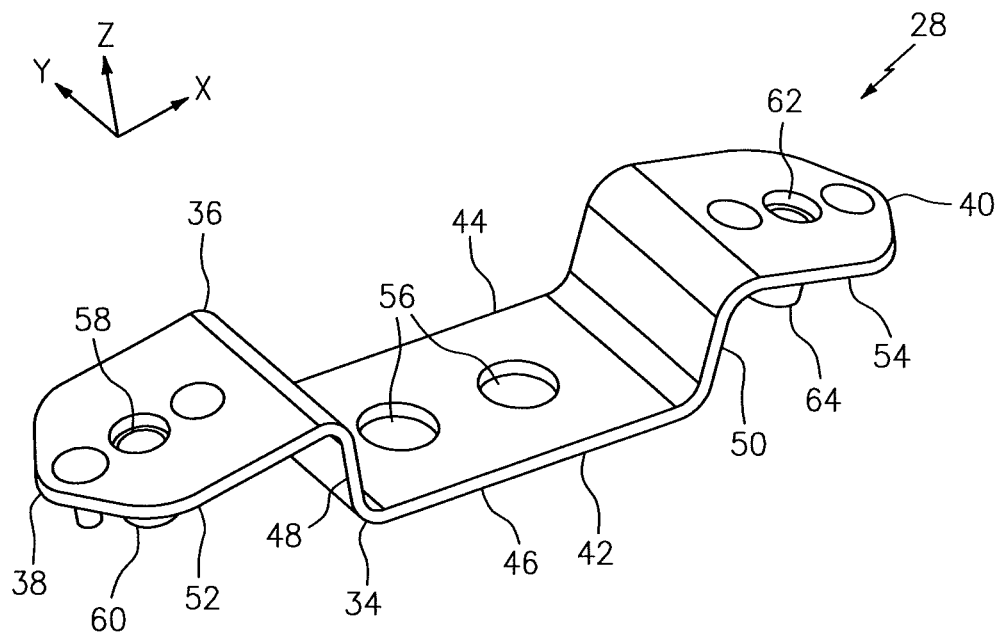
FIGS. 2 and 3 are perspective illustrations of a first mounting bracket.
Figure 3:
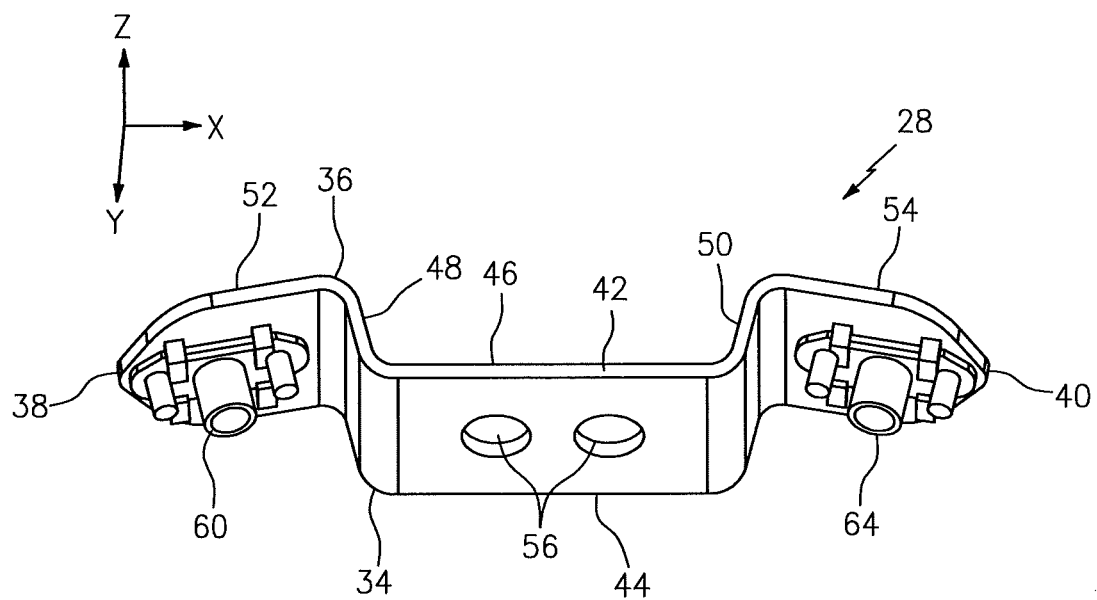
Figure 13:
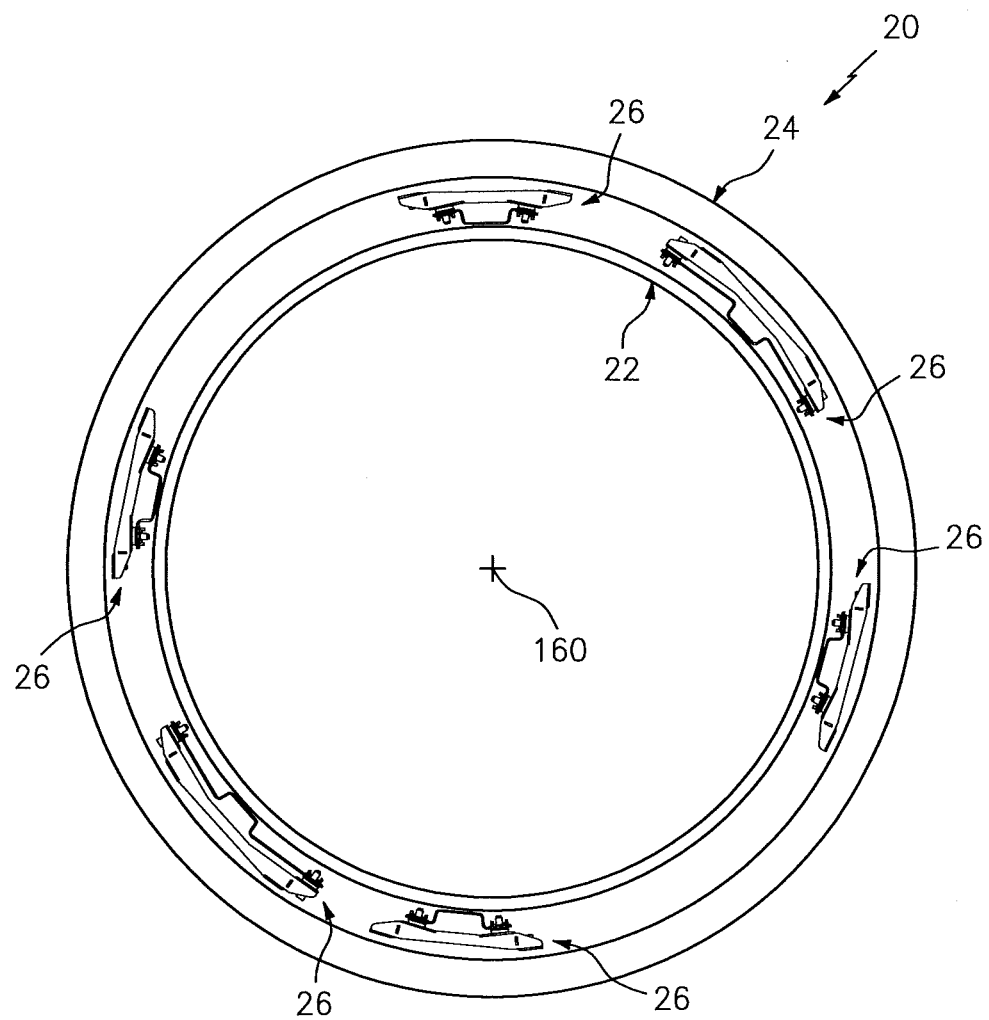
FIG. 13 is another illustration of the turbine engine assembly of FIG. 1.
Figure 15:
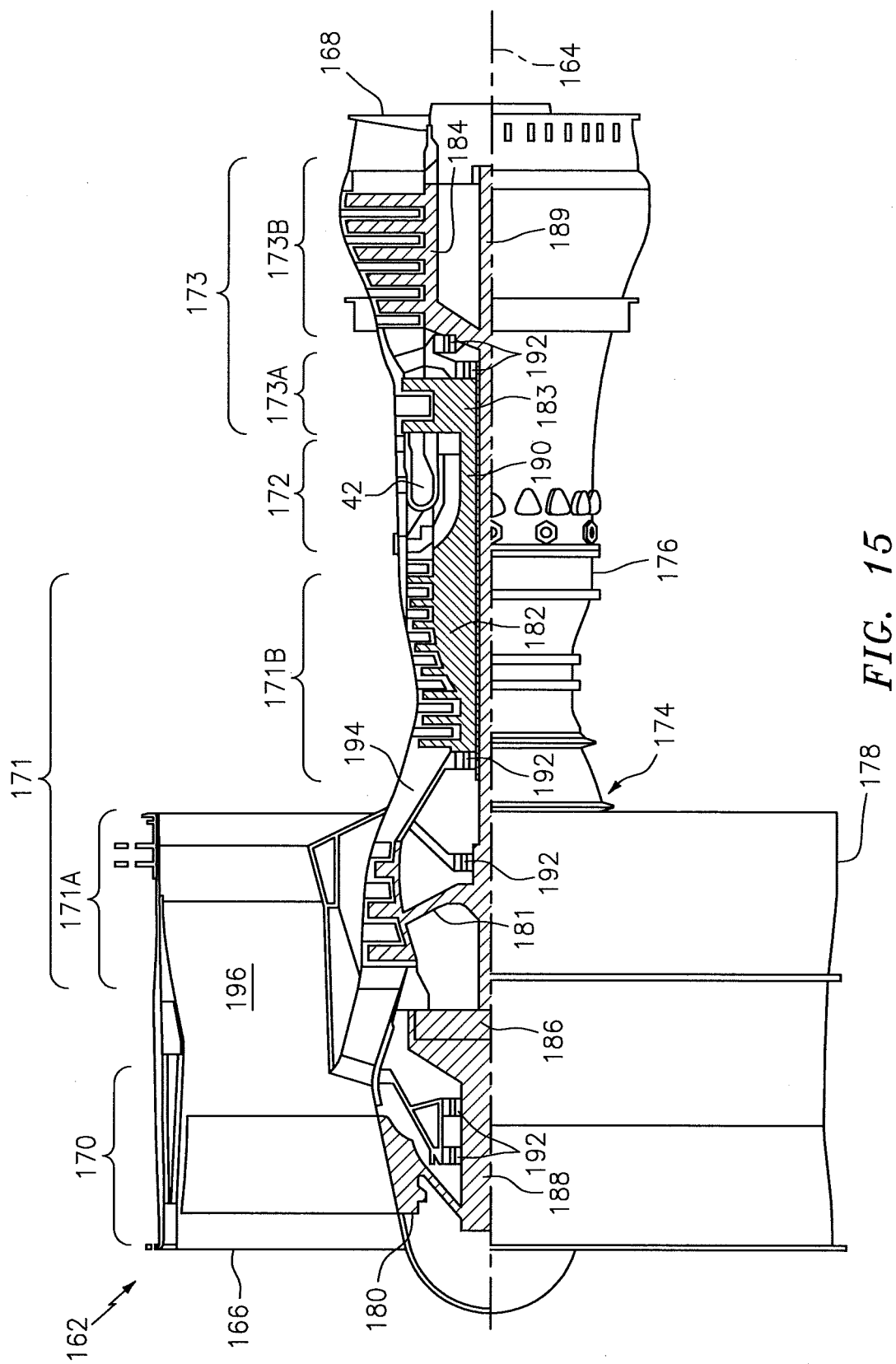
FIG. 15 is a side cutaway illustration of a geared turbine engine.

Referring to FIGS. 2 and 3, the first mounting bracket 28 extends longitudinally generally along a z-axis (e.g., in a radial direction relative to an axial centerline 164 of the turbine engine; see FIGS. 13 and 15) between a first side 34 and an opposing second side 36. The first mounting bracket 28 extends laterally generally along an x-axis (e.g., in a tangential or circumferential direction relative to the axial centerline 164; see FIGS. 13 and 15) between a first end 38 and an opposing second end 40. The first mounting bracket 28 extends transversely generally along a y-axis (e.g., in an axial direction relative to the axial centerline 164; see FIGS. 13 and 15) between a third side 42 and an opposing fourth side 44.

The first mounting bracket 28 of FIGS. 2 and 3 has a flared, generally U-shaped (e.g., hat-shaped) cross-sectional geometry. In particular, this first mounting bracket 28 includes a base 46, a first extension 48 (e.g., a longitudinal jog), a second extension 50 (e.g., a longitudinal jog), a first flange 52 and a second flange 54.

The base 46 is at the first side 34, and extends laterally between respective first distal ends of the first extension 48 and the second extension 50. The base 46 is configured with one or more mounting apertures 56. Each of these mounting apertures 56 extends longitudinally through the base 46.

The first extension 48 extends longitudinally and, for example, slightly laterally out from the base 46 to a second end thereof at the second side 36.

The second extension 50 extends longitudinally and, for example, slightly laterally out from the base 46 to a second end thereof at the second side 36.

The first flange 52 projects generally laterally out from the second end of the first extension 48 to a distal end thereof at the first end 38. The first flange 52 is configured with at least one mounting aperture 58. This mounting aperture 58 extends longitudinally through the first flange 52. The first flange 52 may also be configured with a respective nut plate 60, which is aligned and generally co-axial with the mounting aperture 58.

The second flange 54 projects generally laterally out from the second end of the second extension 50 to a distal end thereof at the second end 40. The second flange 54 is configured with at least one mounting aperture 62. This mounting aperture 62 extends longitudinally through the second flange 54. The second flange 54 may also be configured with a respective nut plate 64, which is aligned and generally co-axial with the mounting aperture 62.

The first mounting bracket 28 of FIGS. 2 and 3 is configured as a single, monolithic body. For example, the first mounting bracket 28 may be formed by cutting and bending sheet metal. Once the first mounting bracket 28 is formed, the nut plates 60 and 64 may be respectively attached (e.g., mechanically fastened, bonded and/or otherwise) to the first and the second flanges 52 and 54. Of course, the present disclosure is not limited to such an exemplary monolithic first mounting bracket 28 or to a sheet metal construction.

Figure 4:
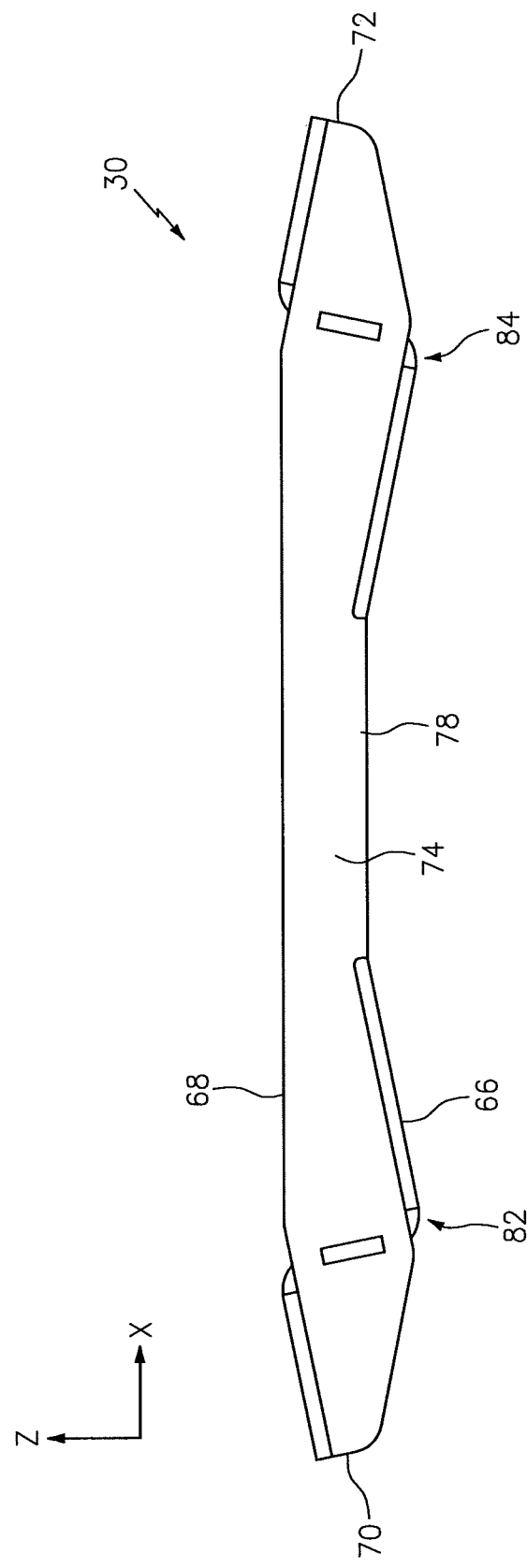
FIG. 4 is an illustration of a second mounting bracket.
Figure 5:
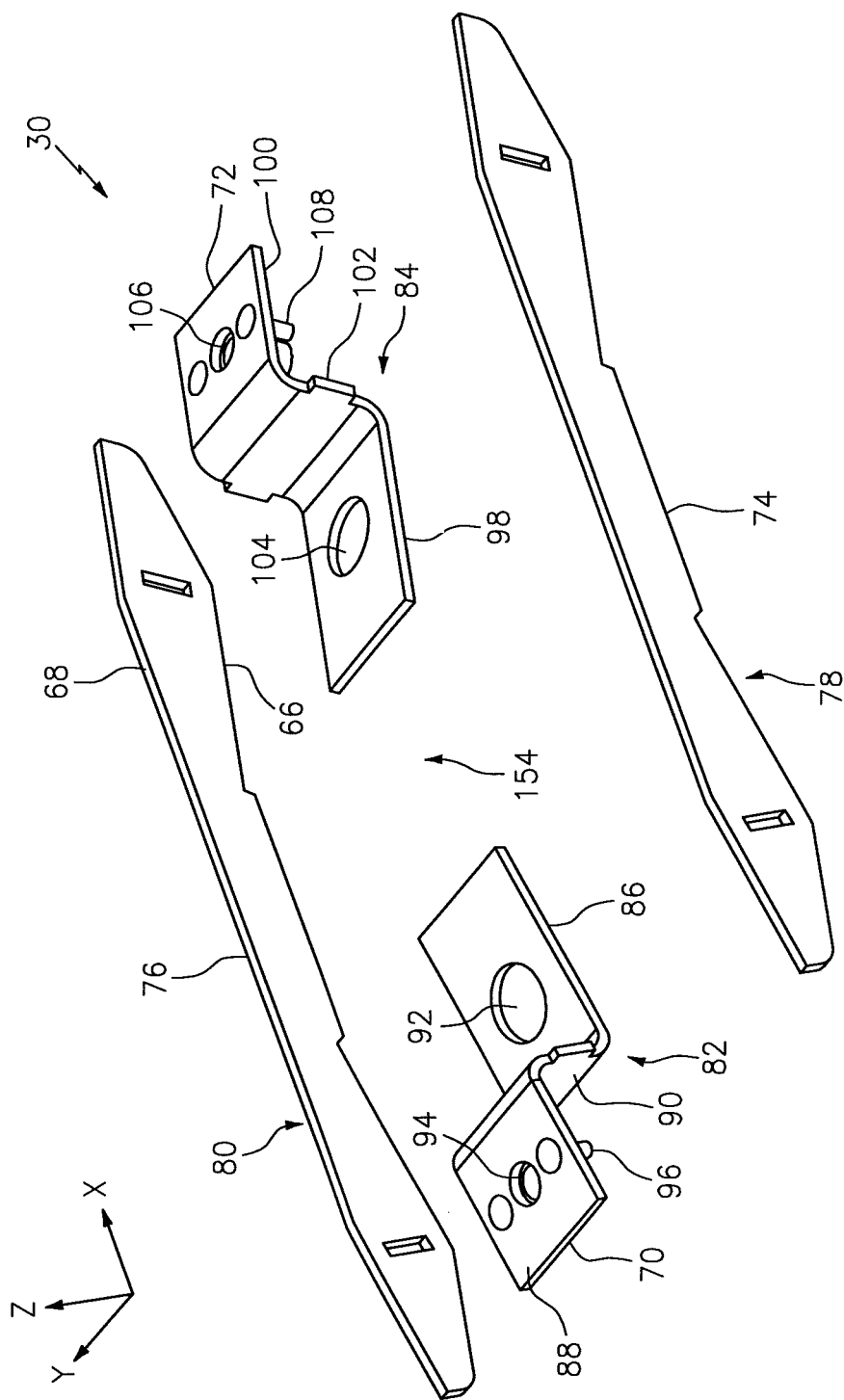
FIG. 5 is a perspective exploded illustration of the second mounting bracket of FIG. 4.

Referring to FIGS. 4 and 5, the second mounting bracket 30 extends longitudinally generally along the z-axis between a first side 66 and an opposing second side 68. The second mounting bracket 30 extends laterally generally along the x-axis between a first end 70 and an opposing second end 72. The second mounting bracket 30 extends transversely generally along the y-axis between a third side 74 and an opposing fourth side 76.

The second mounting bracket 30 of FIGS. 4 and 5 includes one or more sidewalls 78 and 80 and one or more webs 82 and 84. The first sidewall 78 is at the third side 74. The second sidewall 80 is at the fourth side 76. Each sidewall 78, 80 extends laterally between the first end 70 and the second end 72. Each sidewall 78, 80 extends longitudinally between the first side 66 and the second side 68.

Each of the webs 82, 84 extends transversely between the first sidewall 78 and the second sidewall 80. The first web 82 is at the first end 70 and the second web 84 is at the second end 72.

The first web 82 includes a first flange 86, a second flange 88 and an extension 90 (e.g., a longitudinal jog). The first flange 86 is at the first side 66, and projects laterally from a first end of the extension 90 (in a direction towards the second web 84) to a distal end thereof. The first flange 86 is configured with at least one mounting aperture 92. This mounting aperture 92 extends longitudinally through the first flange 86.

The extension 90 extends longitudinally and, for example, slightly laterally out from the first flange 86 to a second end thereof at the second side 68.

The second flange 88 is at the second side 68, and projects laterally from a second end of the extension 90 (in a direction away the second web 84) to a distal end thereof. The second flange 88 is configured with at least one mounting aperture 94. This mounting aperture 94 extends longitudinally through the second flange 88. The second flange 88 may also be configured with a respective nut plate 96, which is aligned and generally co-axial with the mounting aperture 94.

The second web 84 includes a first flange 98, a second flange 100 and an extension 102 (e.g., a longitudinal jog). The first flange 98 is at the first side 66, and projects laterally from a first end of the extension 102 (in a direction towards the first web 82) to a distal end thereof. The first flange 98 is configured with at least one mounting aperture 104. This mounting aperture 104 extends longitudinally through the first flange 98.

The extension 102 extends longitudinally and, for example, slightly laterally out from the first flange 98 to a second end thereof at the second side 68.

The second flange 100 is at the second side 68, and projects laterally from a second end of the extension 102 (in a direction away the first web 82) to a distal end thereof. The second flange 100 is configured with at least one mounting aperture 106. This mounting aperture 106 extends longitudinally through the second flange 100. The second flange 100 may also be configured with a respective nut plate 108, which is aligned and generally co-axial with the mounting aperture 106.

The first and the second webs 82 and 84 may mechanically interface with the sidewalls 78 and 80 through one or more (e.g., mortise-tenon) joints. The first and the second webs 82 and 84 may also or alternatively be welded, brazed, adhered and/or otherwise bonded to the sidewalls 78 and 80.

The second mounting bracket 30 of FIGS. 4 and 5 is configured from a plurality of different pieces (i.e., elements 78, 80, 82 and 84) which are connected together to provide a unitary body. With this configuration, the elements 78, 80, 82 and 84 of the second mounting bracket 30 may each be forming by cutting and bending sheet metal. However, in other embodiments, one or more or all of the elements 78, 80, 82 and 84 of the second mounting bracket 30 may be formed together as a single monolithic body; e.g., the second mounting bracket 30 may be machined or cast as a single body. Of course, the present disclosure is not limited to such exemplary second mounting bracket 30 formation techniques or materials.

Figure 6:
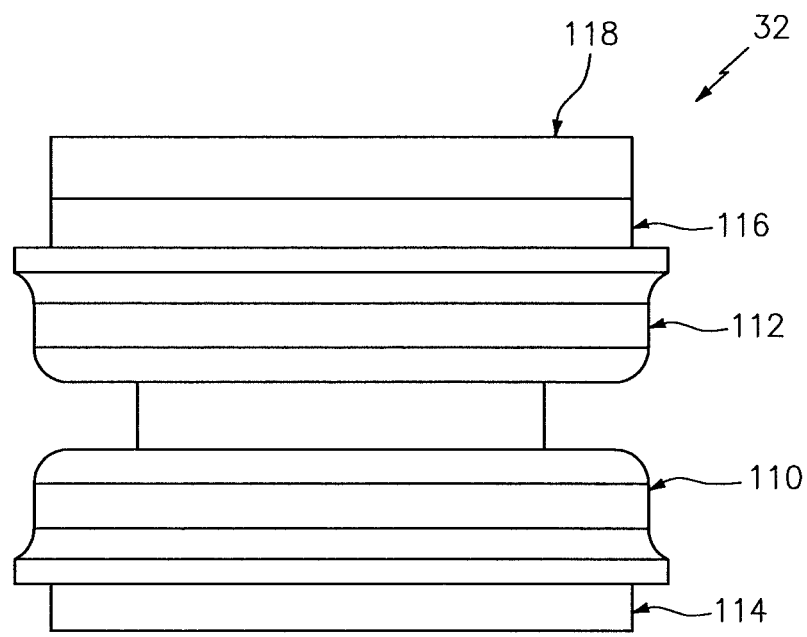
FIG. 6 is an illustration of a resilient mount.
Figure 7:
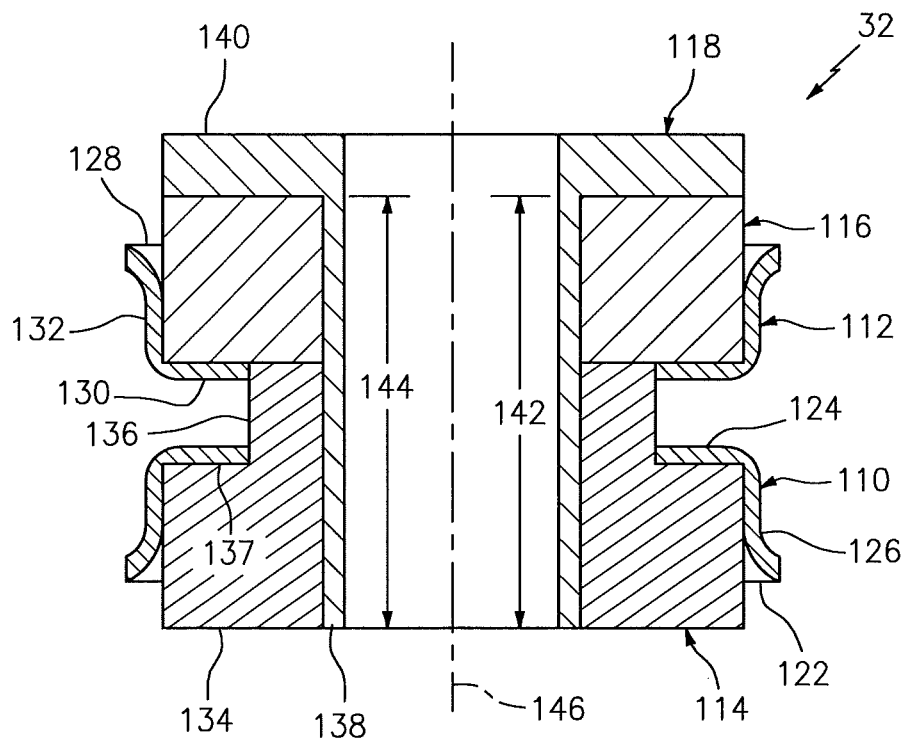
FIG. 7 is a sectional illustration of the resilient mount of FIG. 6.
Figure 8:
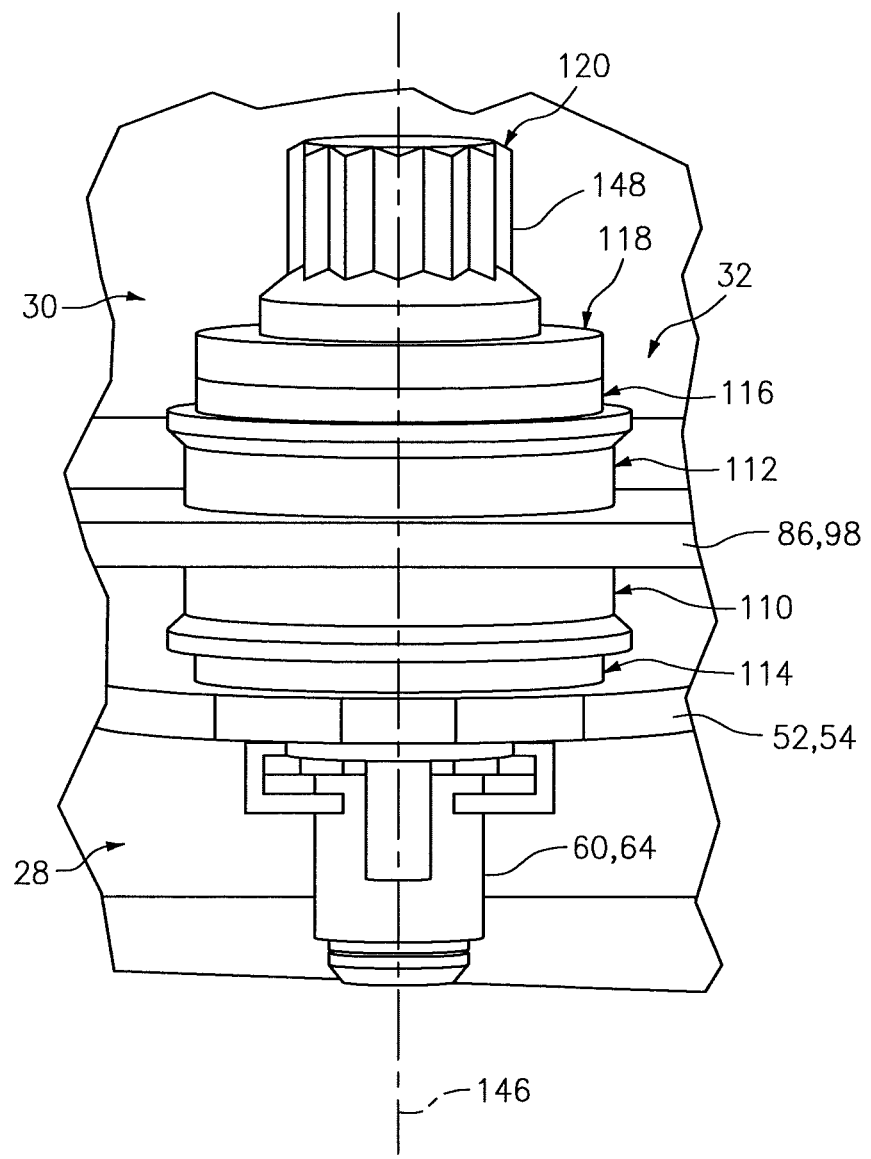
FIG. 8 is a perspective illustration of the resilient mount attaching the second mounting bracket to the first mounting bracket.

Referring to FIGS. 6 to 8, each of the resilient mounts 32 includes a first isolator support 110, a second isolator support 112, a first isolator 114, a second isolator 116, a center post 118 and a fastener 120 (see FIG. 8). Each of these elements 110, 112, 114, 116, 118 and 120 is formed as a discrete element and then assembled together into a stack as described below.

The first isolator support 110 may be configured as a cupped isolator support. For example, the first isolator support 110 may be configured with a recess 122 (e.g., an indentation) for receiving the first isolator 114 therein. In the specific embodiment of FIG. 7, the first isolator support 110 includes an annular base 124 and an annular lip 126. The base 124 is generally planar. The lip 126 extends around an outer periphery of the base 124 and projects longitudinally out from the base 124 to a distal end thereof. The recess 122 is thereby formed within the lip 126 and adjacent the base 124. The first isolator 114 may be configured from metal or any other suitable material.

The second isolator support 112 may be configured as a cupped isolator support. For example, the second isolator support 112 may be configured with a recess 128 (e.g., an indentation) for receiving the second isolator 116 therein. In the specific embodiment of FIG. 7, the second isolator support 112 includes an annular base 130 and an annular lip 132. The base 130 is generally planar. The lip 132 extends around an outer periphery of the base 130 and projects longitudinally out from the base 130 to a distal end thereof. The recess 128 is thereby formed within the lip 132 and adjacent the base 130. The second isolator 116 may be configured from metal or any other suitable material.

The first isolator 114 is configured as a compliant body. For example, the first isolator 114 is configured from an annular solid body of wire mesh. However, the present disclosure is not limited to the foregoing exemplary material. For example, in a relatively cool environment, the first isolator 114 may be configured from an elastomeric material.

The first isolator 114 of FIG. 7 includes an annular first portion 134 and an annular second portion 136. The first portion 134 has a larger lateral width (e.g., diameter) than the second portion 136. As a result, an annular shelf 137 is formed at an interface between the first portion 134 and the second portion 136.

The second isolator 116 is configured as a compliant body. For example, the second isolator 116 is configured from an annular solid body of wire mesh. However, the present disclosure is not limited to the foregoing exemplary material. For example, in a relatively cool environment, the second isolator 116 may be configured form an elastomeric material.

The second isolator 116 of FIG. 7 is configured as an annular puck. In the specific embodiment of FIG. 7, the second isolator 116 is configured to be similar to the first portion 134 of the first isolator 114. Of course, in other embodiments, the second isolator 116 may include additional features such as, for example, a second portion as described above with respect to the first isolator 114. In such an embodiment, the first isolator 114 may or may not include the second portion 136.

The center post 118 includes a tubular base 138 and an annular flange portion 140, which projects laterally out from the tubular base 138. The tubular base 138 extends longitudinally away from the flange portion 140 to a distal end thereof. A longitudinal length 142 of the tubular base 138 from the flange portion 140 to the distal end may be sized to be substantially equal to or slightly smaller than the combined longitudinal lengths 144 of the isolators 114 and 116 before resilient mount 32 assembly. When smaller, the longitudinal length 142 may be sized such that the isolators 114 and 116 have a certain amount of pre-compressions after resilient mount 32 assembly.

Referring to FIG. 8, the fastener 120 has a longitudinal centerline 146. The fastener 120 includes a bolt 148 and a respective one of the nut plates 60, 64. Of course, the present disclosure is not limited to the foregoing exemplary fastener 120. For example, in other embodiments, the nut plate 60, 64 may be replaced with a standalone nut and washer. The mounting apertures 58, 62 (see FIG. 2) may be tapped and, thus, the nut/nut plate may be omitted. Still in other embodiments, the bolt 148 may be replaced with another element such as a rivet, etc.

Figure 9:
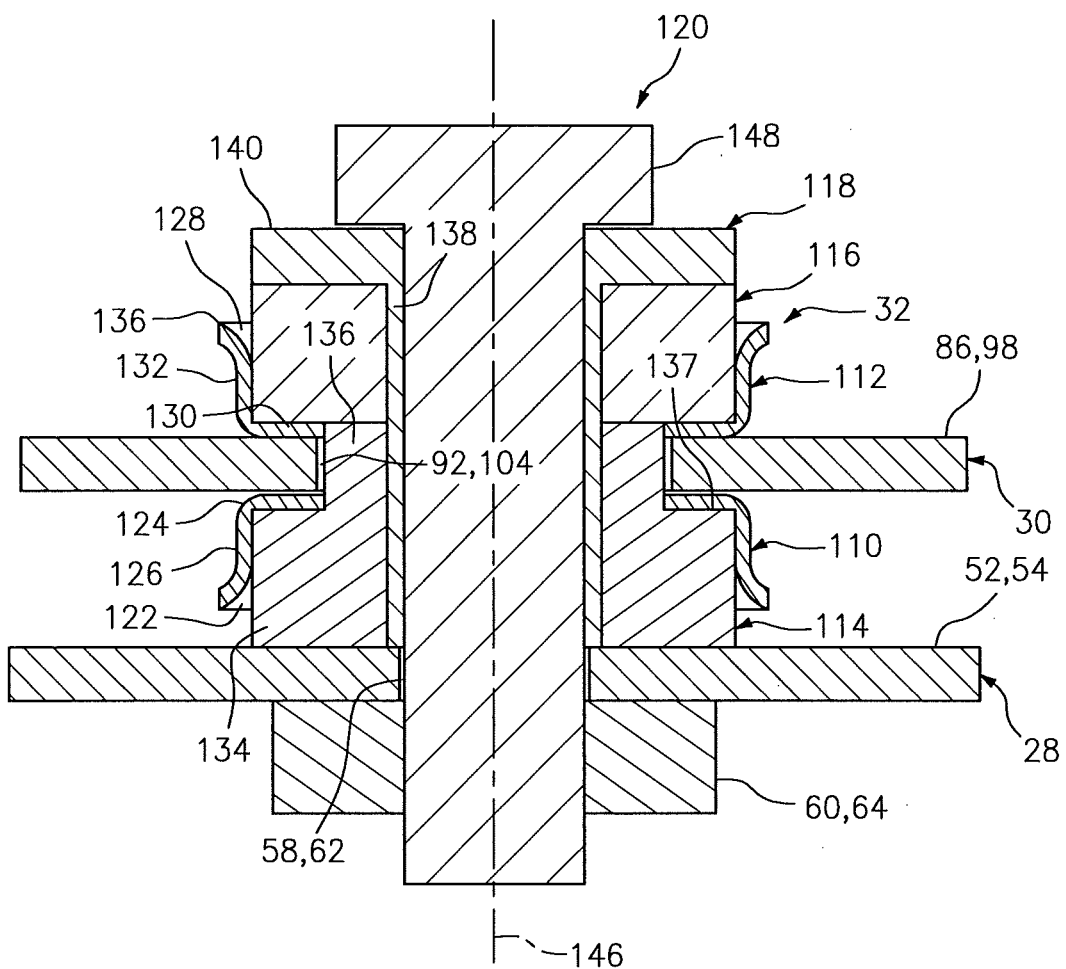
FIG. 9 is a sectional illustration of the elements in FIG. 8.

Referring to FIG. 9, during assembly of each resilient mount 32, the first isolator 114 is mated with the first isolator support 110. More particularly, the first portion 134 is disposed within the recess 122 of the first isolator support 110 such that the second portion 136 projects through an aperture formed by the base 124. With this configuration, the first isolator support 110 and, more particularly, the base 124 is seated on the shelf 137. The base 124 thereby circumscribes the second portion 136 and longitudinally abuts and contacts the first portion 134. The lip 126 longitudinally overlaps and circumscribes the first portion 134.

The second isolator 116 is mated with the second isolator support 112. More particularly, the second isolator 116 is disposed within the recess 128 of the second isolator support 112 such that the second isolator 116 longitudinally abuts and contacts the base 130. The lip 132 longitudinally overlaps and circumscribes the second isolator 116.

The second portion 136 is mated with a respective one of the mounting apertures 92, 104. The second isolator 116 and second isolator support 112 are aligned (e.g., made substantially co-axial) with the first isolator 114 and the second isolator support 112, where the second portion 136 longitudinally engages (e.g., contacts) the second isolator 116. The center post 118 is mated with the elements 110, 112, 114 and 116 such that the flange portion 140 is abutted longitudinally against and contacts the second isolator 116 and the tubular base 138 projects through the stack of elements 110, 112, 114 and 116.

A bore of the center post 118 is aligned (e.g., made substantially co-axial with) a respective one of the mounting apertures 58, 62 and a respective one of the nut plates 60, 64. The bolt 148 is inserted into the bore of the center post 118 and mated with the nut plate 60, 64. The bolt 148 may be tightened onto the nut plate 60, 64 until the distal end of the center post 118 longitudinally engages the first mounting bracket 28; e.g., thereby pre-loading the isolators 114 and 116. In this manner, the resilient mounts 32 attach the second mounting bracket 30 to the first mounting bracket 28.

With the foregoing configuration, each resilient mount 32 attaches a respective one of the first flanges 86, 98 of the second mounting bracket 30 to a respective one of the first flanges 52, 54 of the first mounting bracket 28. The first flange 86, 98 is longitudinally between the first isolator support 110 and the second isolator support 112 such that the base 124 provides a buffer between the first isolator 114 and the first flange 86, 98 and the base 130 provides a buffer between the second isolator 116 and the first flange 86, 98. The first isolator 114 is longitudinally between and longitudinally engages (e.g., contacts) the first flange 52, 54 and the base 124 of the first isolator support 110. The second isolator 116 is longitudinally between and longitudinally engages (e.g., contacts) the base 130 of the second isolator support 112 and the flange portion 140 and, therethrough, a head of the bolt 148.

Referring to FIG. 1, the first mounting bracket 28 is attached (e.g., rigidly) to the first turbine engine component 22 by one or more fasteners 150 (e.g., studs and nuts), where each fastener 150 is mated with a respective one of the mounting apertures 56 (see FIG. 2). The second mounting bracket 30 is attached (e.g., rigidly) to mounting tabs of the second turbine engine components 24 by one or more fasteners 152, where each fastener 152 is mated with a respective one of the mounting apertures 96, 108 (see FIG. 5).

Figure 10:
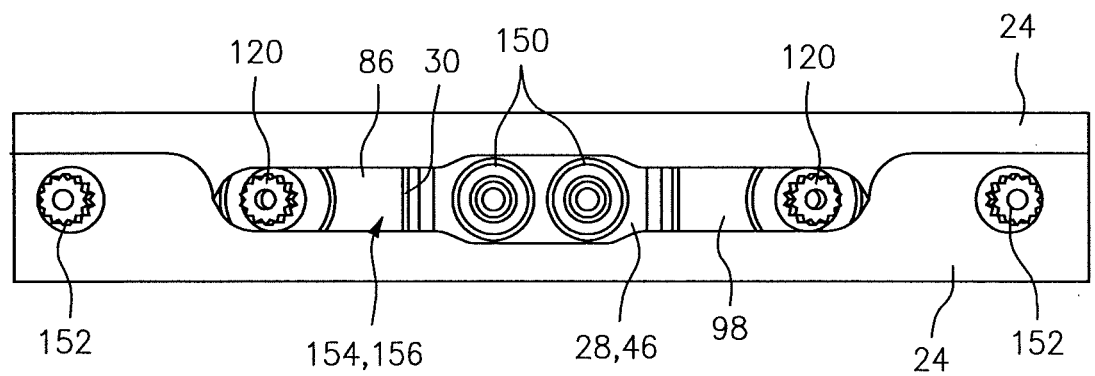
FIG. 10 is an overhead illustration of the assembly of FIG. 1.

Referring to FIG. 10, the second mounting bracket 30 and the second components may be respectively configured with openings 154 and 156. The opening 154 may be formed laterally between the first flanges 86 and 98 and transversely between the sidewalls 78 and 80 (see FIG. 5). The opening 156 may be formed transversely and laterally between the mounting tabs of the second turbine engine components 24.

The openings 154 and 156 are aligned to provide a longitudinal line-of-sight through the second mounting bracket 30 and between the second turbine engine components 24 to the mounting apertures 56 (see FIG. 2) and, thus, the fasteners 150 mated therewith. This enables the fasteners 150 and/or the fasteners 120 to be removed without removing the second turbine engine components 24 from the resilient mounting assembly 26, and/or removing the second mounting bracket 30 from the first mounting bracket 28.

Figure 11:
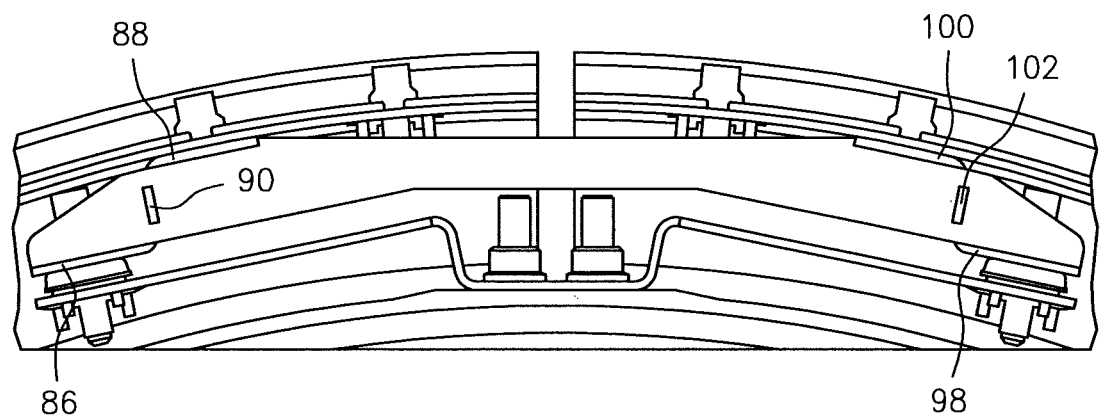
FIG. 11 is an illustration of another resilient mounting assembly attaching a second turbine engine component to a first turbine engine component.

In some embodiments, referring to FIG. 5, the first flanges 86 and 98 may be aligned laterally between the second flanges 88 and 100. However, in other embodiments, the second flanges 88 and 100 may be aligned laterally between the first flanges 86 and 98 as shown in FIG. 11.

Figure 12:
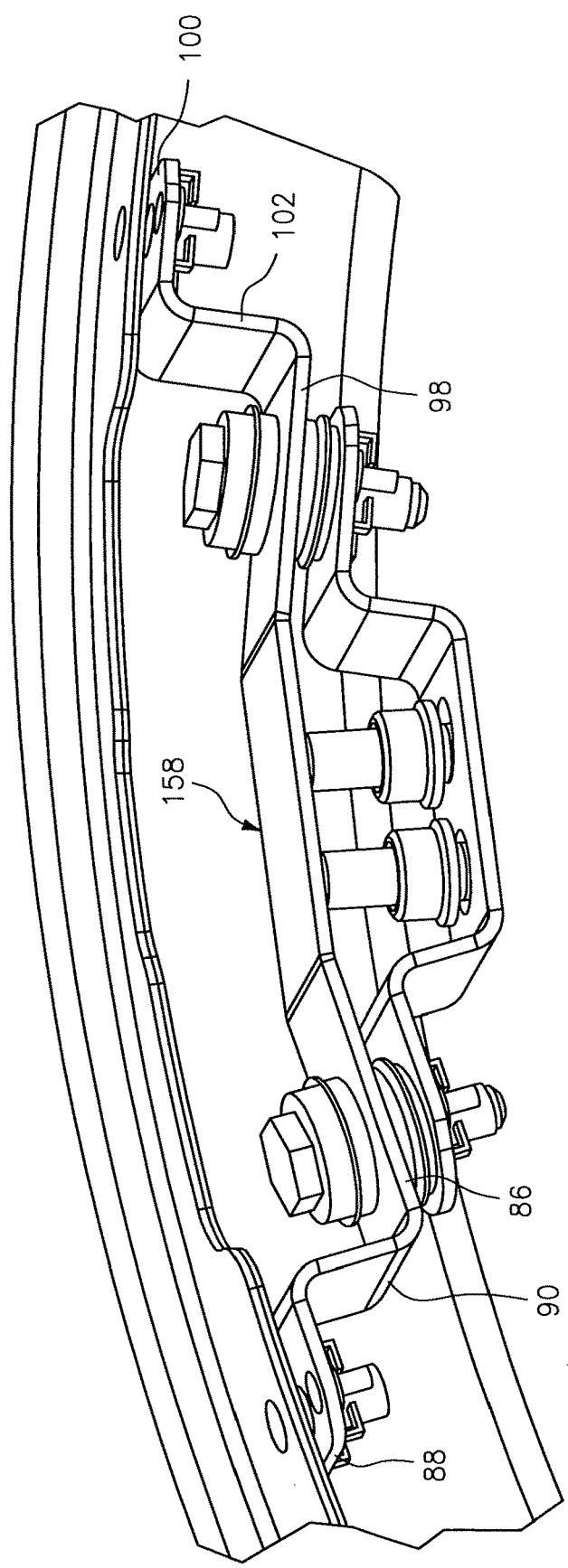
FIG. 12 is a perspective illustration of another resilient mounting assembly attaching the second turbine engine component to the first turbine engine component.

In some embodiments, referring to FIG. 12, the first flanges 86 and 98 may be formed together as a base 158. In addition or alternatively, the second mounting bracket 30 may omit one or more of the sidewalls 78 and/or 80.

In some embodiments, referring to FIG. 13, a plurality of the resilient mounting assemblies 26 with the same or different configurations may be arranged circumferentially about the first turbine engine component 22 to attach the components together.

Figure 14:
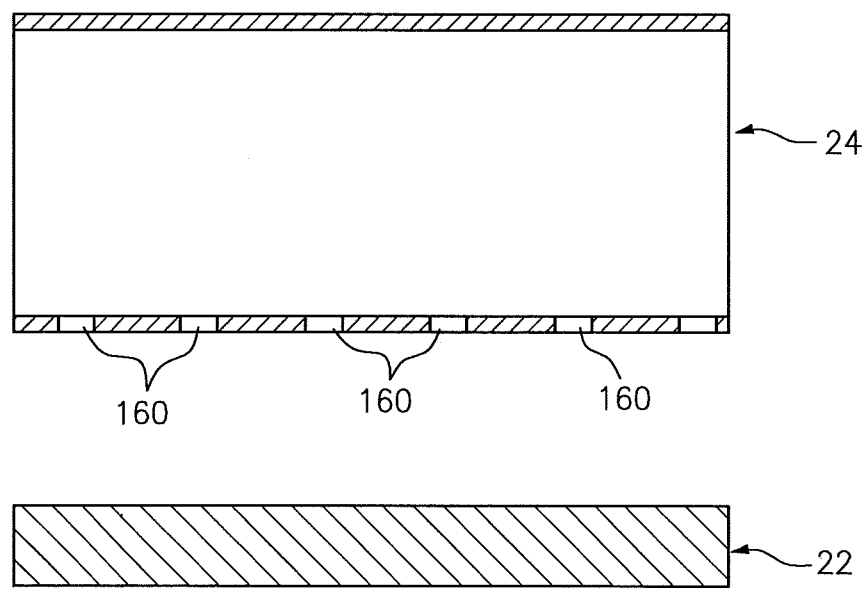
FIG. 14 is a partial schematic illustration of the first turbine engine component and the second turbine engine component.

In some embodiments, the first turbine engine component 22 may be configured as a turbine engine case such as, but not limited to, a high pressure turbine case. Each of the second turbine engine components 24 may be configured as a duct of an active clearance control system. Each duct extends at least partially (or substantially completely) around the turbine engine case, and is configured to direct impingement air onto the turbine engine case. For example, referring to FIG. 14, each duct may include a plurality of impingement holes 160 in close proximity to the turbine engine case.

FIG. 15 is a side cutaway illustration of a geared turbine engine 162 with which the turbine engine assembly 20 may be included. The turbine engine 162 extends along an axial centerline 164 between an upstream airflow inlet 166 and a downstream airflow exhaust 168. The turbine engine 162 includes a fan section 170, a compressor section 171, a combustor section 172 and a turbine section 173. The compressor section 171 includes a low pressure compressor (LPC) section 171A and a high pressure compressor (HPC) section 171B. The turbine section 173 includes a high pressure turbine (HPT) section 173A and a low pressure turbine (LPT) section 173B.

The engine sections 170-173 are arranged sequentially along the centerline 164 within an engine housing 174. This housing 174 includes an inner case 176 (e.g., a core case) and an outer case 178 (e.g., a fan case). The inner case 176 may house one or more of the engine sections 171-173; e.g., an engine core. This inner case 176 may include one or more axial segments, which include the first turbine engine component 22. The outer case 178 may house at least the fan section 170.

Each of the engine sections 170, 171A, 171B, 173A and 173B includes a respective rotor 180-184. Each of these rotors 180-184 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 180 is connected to a gear train 186, for example, through a fan shaft 188. The gear train 186 and the LPC rotor 181 are connected to and driven by the LPT rotor 184 through a low speed shaft 189. The HPC rotor 182 is connected to and driven by the HPT rotor 183 through a high speed shaft 190. The shafts 188-190 are rotatably supported by a plurality of bearings 192. Each of these bearings 192 is connected to the engine housing 174 by at least one stationary structure such as, for example, an annular support strut.

During operation, air enters the turbine engine 162 through the airflow inlet 166. This air is directed through the fan section 170 and into a core gas path 194 and a bypass gas path 196. The core gas path 194 extends sequentially through the engine sections 171-173; e.g., an engine core. The air within the core gas path 194 may be referred to as "core air". The bypass gas path 196 extends through a bypass duct, which bypasses the engine core. The air within the bypass gas path 196 may be referred to as "bypass air".

The core air is compressed by the compressor rotors 181 and 182 and directed into a combustion chamber of a combustor in the combustor section 172. Fuel is injected into the combustion chamber and mixed with the compressed core air to provide a fuel-air mixture. This fuel air mixture is ignited and combustion products thereof flow through and sequentially cause the turbine rotors 183 and 184 to rotate. The rotation of the turbine rotors 183 and 184 respectively drive rotation of the compressor rotors 182 and 181 and, thus, compression of the air received from the core airflow inlet. The rotation of the turbine rotor 184 also drives rotation of the fan rotor 180, which propels bypass air through and out of the bypass gas path 196. The propulsion of the bypass air may account for a majority of thrust generated by the turbine engine 162, e.g., more than seventy-five percent (75%) of engine thrust. The turbine engine 162 of the present disclosure, however, is not limited to the foregoing exemplary thrust ratio.

The turbine engine assembly 20 may be included in various turbine engines other than the one described above. The turbine engine assembly 20, for example, may be included in a geared turbine engine where a gear train connects one or more shafts to one or more rotors in a fan section, a compressor section and/or any other engine section. Alternatively, the turbine engine assembly 20 may be included in a turbine engine configured without a gear train. The turbine engine assembly 20 may be included in a geared or non-geared turbine engine configured with a single spool, with two spools (e.g., see FIG. 15), or with more than two spools. The turbine engine may be configured as a turbofan engine, a turbojet engine, a propfan engine, a pusher fan engine or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:
1. An assembly for a turbine engine, comprising:
a turbine engine case;
a duct of an active clearance control system, the duct extending circumferentially about the turbine engine case and configured to direct impingement air onto the turbine engine case;
a first mounting bracket;
a second mounting bracket; and
a first resilient mount attaching the second mounting bracket to the first mounting bracket, the first resilient mount including a first isolator support, a second isolator support, a first isolator, a second isolator and a fastener;
the first isolator support and the second isolator support arranged on opposing sides of the second mounting bracket, wherein the first isolator support is between the second mounting bracket and the first isolator, and the second isolator support is between the second mounting bracket and the second isolator;
the first isolator is between the first isolator support and the first mounting bracket; and
the fastener projecting through the first mounting bracket, the second mounting bracket, the first isolator support, the second isolator support, the first isolator and the second isolator;

wherein the first mounting bracket is attached to the turbine engine case; and
wherein the second mounting bracket is attached to the duct.

2. The assembly of claim 1, wherein
the first isolator is within a recess of the first isolator support; and
the second isolator is within a recess of the second isolator support.

3. The assembly of claim 1, wherein the first isolator support comprises a cupped isolator support that include a base and an annular lip, the base is between and longitudinally contacts the second mounting bracket and the first isolator, and the lip circumscribes the first isolator.

4. The assembly of claim 1, wherein the second isolator support comprises a cupped isolator support that includes an annular base and an annular lip, the base is between and longitudinally contacts the second mounting bracket and the second isolator, and the lip circumscribes the second isolator.

5. The assembly of claim 1, wherein at least one of the first isolator or the second isolator comprises a body of metal wire mesh.

6. The assembly of claim 1, wherein the first isolator and the second isolator each comprises a body of metal wire mesh.

7. The assembly of claim 1, wherein the first isolator comprises a first portion and a second portion, a shelf is formed between the first portion and the second portion, the first isolator support is seated on the shelf such that the second portion projects through the first isolator support and engages the second isolator.

8. The assembly of claim 1, wherein the second isolator is configured as an annular puck.

9. The assembly of claim 1, wherein the first resilient mount further comprises a center post which projects through the second mounting bracket, the first isolator support, the second isolator support, the first isolator and the second isolator, and the center post extends longitudinally between and longitudinally engages the fastener and the first mounting bracket.

10. The assembly of claim 1, wherein
the fastener comprises a bolt and a nut plate;
the bolt projects through the first mounting bracket, the second mounting bracket, the first isolator support, the second isolator support, the first isolator and the second isolator; and
the nut plate is mated with the bolt and mounted to the first mounting bracket on a side of the first mounting bracket opposite the first isolator.

11. The assembly of claim 1, further comprising a second resilient mount, wherein
the first mounting bracket comprises a first flange and a second flange;
the first resilient mount attaches the second mounting bracket to the first flange; and
the second resilient mount attaches the second mounting bracket to the second flange.

12. The assembly of claim 11, wherein the second resilient mount includes a first isolator support, a second isolator support, a first isolator, a second isolator and a fastener;
the first isolator support and the second isolator support are arranged on opposing sides of the second mounting bracket;
the first isolator support is between the second mounting bracket and the first isolator;
the second isolator support is between the second mounting bracket and the second isolator;
the first isolator is between the first isolator support and the second flange; and
the fastener projects through the second flange, the second mounting bracket, the first isolator support, the second isolator support, the first isolator and the second isolator.

13. The assembly of claim 11, wherein
the first mounting bracket further comprises a base laterally between and longitudinally offset from the first flange and the second flange; and
the second mounting bracket is configured with an opening that provides a longitudinally extending line of sight through the first mounting bracket to one or more apertures in the base.

14. The assembly of claim 11, further comprising a pair of mounting fasteners attaching the second mounting bracket to the duct, wherein the mounting fasteners are aligned laterally between the first resilient mount and the second resilient mount.

15. The assembly of claim 11, further comprising a pair of mounting fasteners attaching the second mounting bracket to the duct, wherein the first resilient mount and the second resilient mount are aligned laterally between the mounting fasteners.

16. The assembly of claim 1, wherein the second mounting bracket is configured from a plurality of discrete pieces of formed sheet metal that are bonded together.

17. An assembly for a turbine engine, comprising:
an active clearance control system;
a turbine engine case;
a turbine engine component outside of the turbine engine case; and
a resilient mounting assembly radially between the turbine engine case and the turbine engine component, the resilient mounting assembly comprising a first mounting bracket, a second mounting bracket and a first resilient mount;
the first mounting bracket attached to the turbine engine case;
the second mounting bracket attached to the turbine engine component;
the first resilient mount attaching the second mounting bracket to the first mounting bracket, the first resilient mount including a first isolator, a second isolator and a fastener with a longitudinal centerline; and
the fastener configured with and extending longitudinally through the first mounting bracket, the second mounting bracket, the first isolator and the second isolator such that the second mounting bracket is longitudinally between the first isolator and the second isolator, the first isolator is compressed longitudinally between the first mounting bracket and the second mounting bracket, and the second isolator is compressed longitudinally between the second mounting bracket and a head of the fastener;
wherein the turbine engine component comprises a duct of the active clearance control system; and
wherein the duct extends at least partially circumferentially around the turbine engine case and is configured to direct impingement air onto the turbine engine case.

18. An assembly for a turbine engine, comprising:
a turbine engine case;
a turbine engine component outside of the turbine engine case; and a resilient mounting assembly radially between the turbine engine case and the turbine engine component, the resilient mounting assembly comprising a first mounting bracket, a second mounting bracket and a first resilient mount;

the first mounting bracket attached to the turbine engine case;

the second mounting bracket attached to the turbine engine component;

the first resilient mount attaching the second mounting bracket to the first mounting bracket, the first resilient mount including a first isolator, a second isolator and a fastener with a longitudinal centerline; and the fastener configured with and extending longitudinally through the first mounting bracket, the second mounting bracket, the first isolator and the second isolator such that the second mounting bracket is longitudinally between the first isolator and the second isolator, the first isolator is compressed longitudinally between the first mounting bracket and the second mounting bracket, and the second isolator is compressed longitudinally between the second mounting bracket and a head of the fastener;

wherein the first resilient mount further includes
- a first isolator support providing a longitudinal buffer between the first isolator and the second mounting bracket; and
- a second isolator support providing a longitudinal buffer between the second isolator and the second mounting bracket.

* * * * *